United States Patent [19]

Spiess

[11] Patent Number: 5,278,563
[45] Date of Patent: Jan. 11, 1994

[54] VEHICLE IDENTIFICATION AND CLASSIFICATION SYSTEMS

[76] Inventor: Newton E. Spiess, 1379 SW. Albatross Way, Palm City, Fla. 34990

[21] Appl. No.: 941,716
[22] Filed: Sep. 8, 1992
[51] Int. Cl.$^5$ .............................................. G01S 13/80
[52] U.S. Cl. ........................................ 342/44; 342/50; 342/51
[58] Field of Search .................... 342/51, 44, 42, 50

[56] References Cited

U.S. PATENT DOCUMENTS

| | | | |
|---|---|---|---|
| 3,691,557 | 9/1972 | Constant | 342/25 |
| 3,878,528 | 4/1975 | Majeau | 342/44 |
| 3,964,024 | 6/1975 | Hutton | 342/44 |
| 3,981,011 | 9/1976 | Bell III | 342/44 |
| 4,001,822 | 1/1977 | Sterger | 342/51 |
| 4,006,477 | 2/1977 | Yost, Jr. et al. | 342/51 |
| 4,144,534 | 3/1979 | Prickett et al. | 342/43 |
| 4,180,752 | 12/1979 | Hill | 342/43 |
| 4,339,753 | 7/1982 | Mawhenny | 342/457 |
| 4,628,319 | 12/1986 | Morwing et al. | 342/46 |
| 4,740,792 | 4/1988 | Sagey | 342/457 |
| 4,818,998 | 4/1989 | Apsell et al. | 342/125 |
| 4,937,581 | 6/1990 | Baldwin et al. | 342/51 |
| 5,014,061 | 5/1991 | Ghose | 342/45 |
| 5,073,780 | 12/1991 | Barley et al. | 342/45 |
| 5,091,917 | 2/1992 | Udd et al. | 375/10 |
| 5,124,699 | 6/1992 | Tervoert et al. | 342/44 X |
| 5,126,746 | 6/1992 | Gritton | 342/125 |

OTHER PUBLICATIONS

Merrell J. Skolnik, Radar Handbook 2nd Ed. 1990.

Primary Examiner—John B. Sotomayor

[57] ABSTRACT

An interrogator-transponder system in which multiple vehicle mounted transponders which may be closely spaced in distance and moving at similar velocities, respond with a coherent identification code signal that is displaced in frequency from the interrogation signal by an amount that is identical for each transponder. The response signal spacings in time (Pulse repetition intervals) are different for each transponder but are always multiples of the pulse repetition interval of the interrogation signal. A coherent reference for the received transponder codes is obtained by combining the coherent interrogation signal with a coherent reference that is substantially identical in frequency to the displacement frequency of the transponder response signal.

Means are provided in the interrogation device to determine the velocity of each transponder and its range with respect to the interrogator and to identify vehicles with inoperative transponders.

The resulting data stream of identification codes and associated velocities and ranges may be used for traffic speed enforcement, wanted vehicle search, interactive traffic signal control, automated toll collection, traffic surveys, and identification of friendly forces.

6 Claims, 2 Drawing Sheets

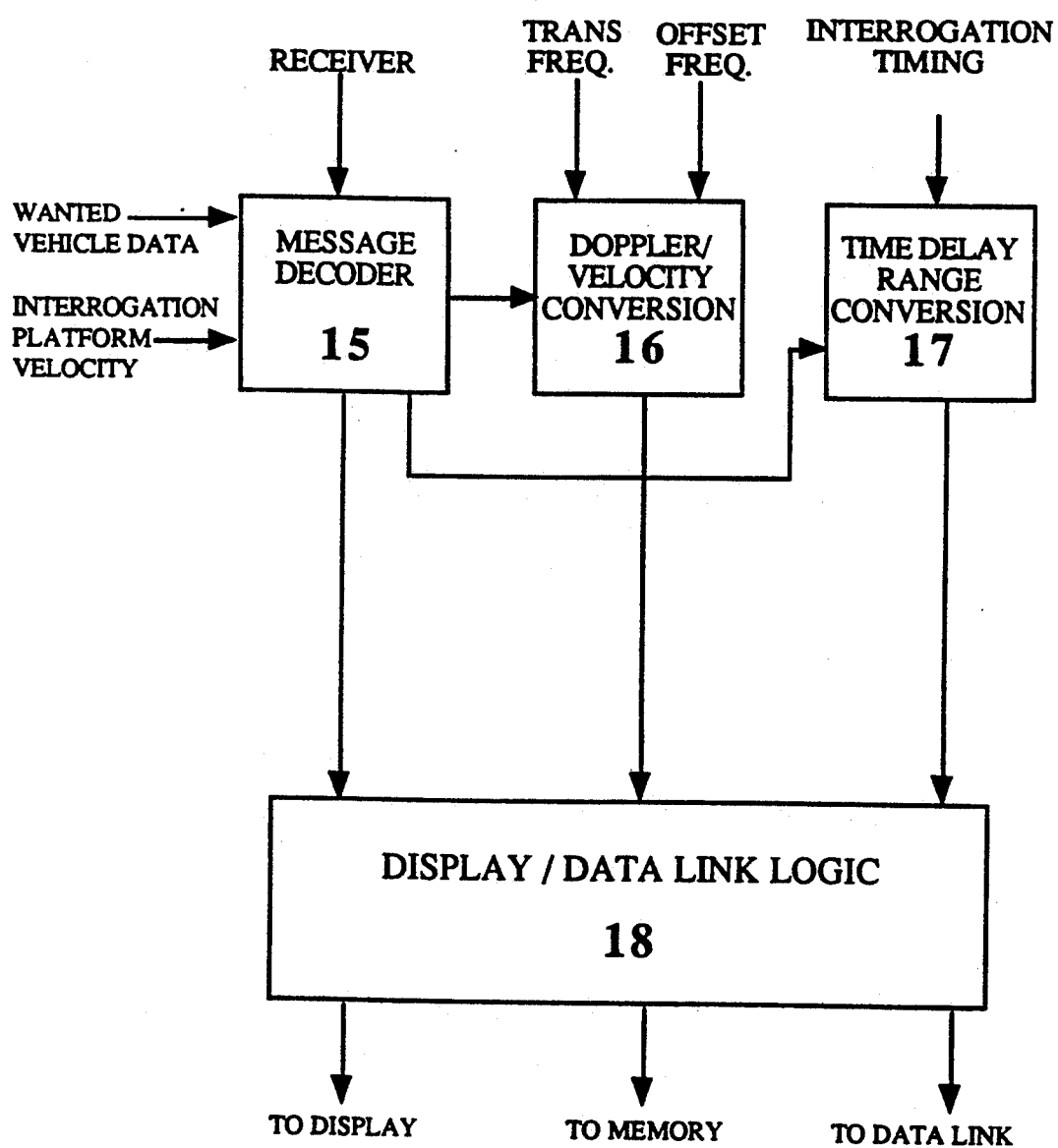

VEHICLE IDENTIFICATION AND CLASSIFICATION SYSTEMS

BACKGROUND—CROSS REFERENCE TO RELATED APPLICATIONS

This invention uses the response repetition interval (RRI) variation and elements of the coherent signal processing of my co-pending application, Ser. No. 07/850,423 filed Mar. 12, 1992.

BACKGROUND—FIELD OF INVENTION

This invention relates to coherent interrogator/offset frequency transponder systems in which transponder identifying codes are rapidly determined by the interrogator and are associated with measured range and relative velocity of the transponders. The system will operate in an environment that includes a multiplicity of interrogators and transponders.

BACKGROUND—DISCUSSION OF PRIOR ART

In the application 07/850,423 filed Mar. 12, 1992, means are described for determining the speed, range and an identification code of multiple vehicles operating in highway environments and the classification of the vehicles according to criteria established by law enforcement authorities. The system of that application has proven to have important uses in law enforcement by virtue of its ability to remotely detect and locate vehicles that are operating illegally and to present that information in a form that is useful to law enforcement authorities. It holds the potential to virtually clear the highways of illegal activities.

It has been found that a system of this type which provides the capability of measuring multiple vehicles, speed, ranges and identification codes have application in addition to the detection and location of "wanted" vehicles. For example, the output data stream is useful in systems for such diverse requirements as conducting road traffic surveys, interactive control of vehicular traffic signals, automatic toll fee collection and, with certain changes, in the digital subsystem, can become a useful sensor in battlefield "friendly fire" control. Such systems can also find use in applications such as tracing of shipping containers as an aid in reducing illegal shipments.

All of these capabilities will result in a significant increase in the numbers of sensors far beyond what was envisioned for law enforcement applications alone. They will eventually become as common as the ubiquitous laser bar code readers used in product distribution systems. In this complex environment it has been found that the system of the application Ser. No. 07/850,423 may be susceptible to excessive levels of mutual interference between systems operating in close proximity, and the electromagnetic radiation to which the public is exposed is higher than necessary. In addition, range measurement at extremely short ranges, as is required for example in traffic signal control, becomes difficult and of reduced accuracy. The determination of closing velocity between the interrogator and the transponder is susceptible to noise inputs which increase the settling time of the associated doppler filters.

OBJECTS AND ADVANTAGES

Accordingly, besides the objects and advantages of the interrogator transponder system of my application Ser. No. 07/850,423, several objects and advantages of the present invention are:

a—to provide frequency separation between the interrogation and response signals while preserving the phase coherent characteristics of the two signals in the decoder digital processor thereby reducing the required transponder power level and decreasing the noise level entering the velocity and range measurement circuitry and software.

b—to reduce the settling time of the doppler filters so as to decrease the time required to determine closing velocity.

c—to provide frequency isolation between the interrogation and response signals so that the time delay representing two-way signal travel time and therefore separation between the interrogation device and the transponder device may be measured as a continuous function from zero to a selectable maximum value.

d—to improve the message decoder logic so as to reduce the effect of simultaneous responses from multiple transponders in a dense transponder and/or interrogator environment.

e—to provide improved interrogator and transponder repetition interval logic so as to improve rejection of simultaneous responses from multiple transponders and improve performance of the doppler/velocity conversion filters.

Further objects and advantages of the invention are to provide an output data stream consisting of identification codes and associated velocities and locations for all vehicles or other movable objects within a preset distance of an interrogation device irrespective of the number of such objects or the fact that they may be at essentially the same angle, range and speed.

DRAWING FIGURES

FIG. 1 shows, of the left side of the page, the components of the transponder device of which one will be mounted on every vehicle or other moveable device authorized to be within the surveillance space.

FIG. 2 shows the details of the decoder/digital processor element of the interrogator which processes the received transponder signals and which in turn outputs a data stream of identification codes and the associated speed and location of the vehicle on which the transponders are mounted.

DESCRIPTION

Figure 1:
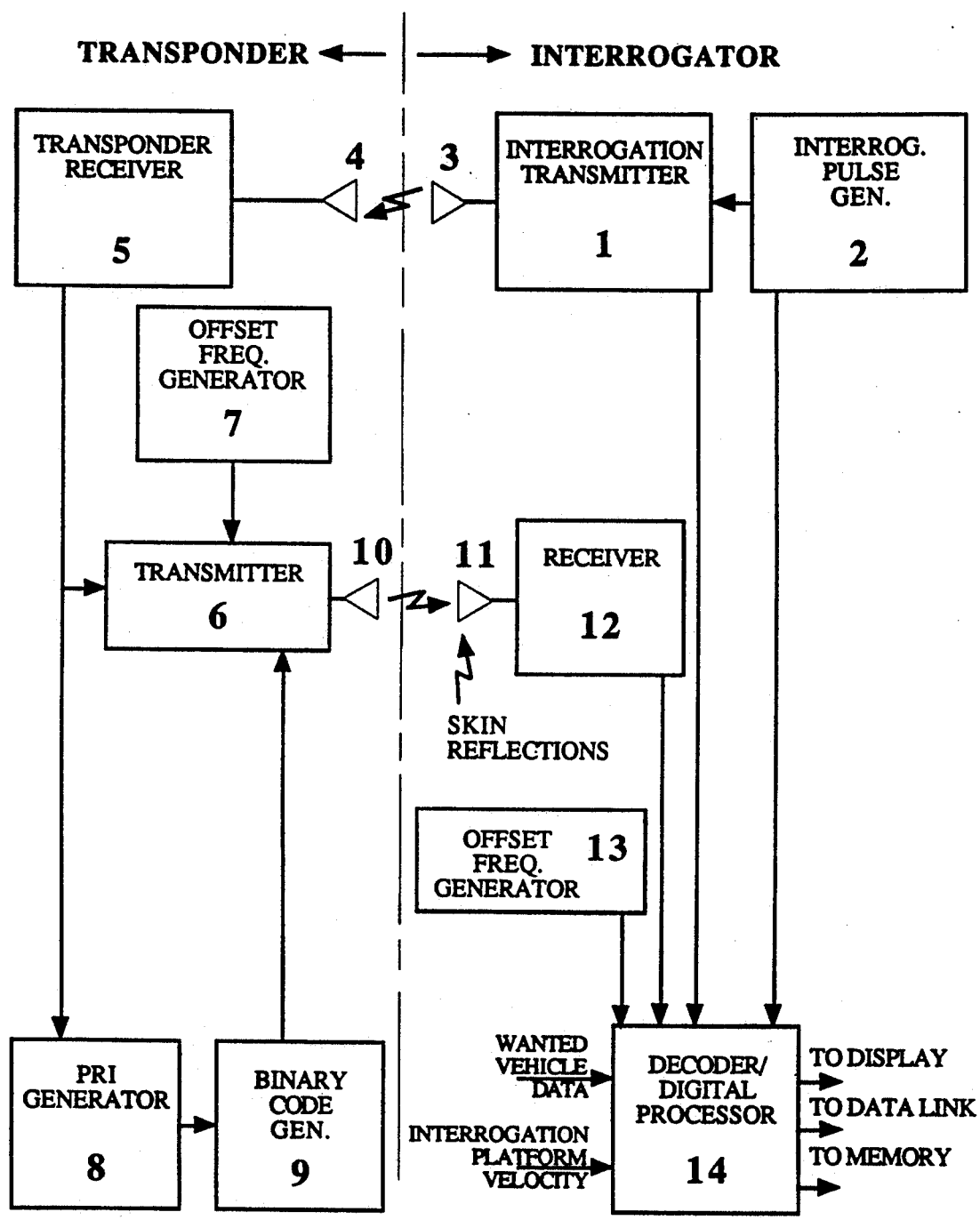
FIG. 1 shows, on the right side of the page, the components of the interrogation device which may be mounted on a movable surveillance platform such as a police car of a surveillance aircraft or may be mounted on a fixed support such as a traffic control signal or a toll collection station.

A typical embodiment of the present invention is illustrated in FIG. 1 and FIG. 2.

Referring to FIG. 1, the transmitter 1 transmits a coherent signal through antenna 3 under control of the interrogation pulse generator 2. The signal may be of sufficient spectral purity to prevent significant frequency variation over a period of time greater than the settling time of the doppler filters that are a component of the decoder/digital process 14.

The interrogation pulse generator 2 provides the timing clock for both the interrogator and the transponder and performs the function of keying the transmitter so that its output is modulated to form an interrogation signal that is recognizable by the transponder. The interval between interrogation signals may be programmable and may be varied as a function of time, and may vary from interrogator to interrogator. For example, where the desired maximum range between the interrogator and the transponder is large relative to the range equivalent of the interrogation interval, it is desirable to vary the interrogation interval in order to resolve range ambiguities which may appear at the decoder/digital processor. Where it is desirable to prevent hostile responses by vehicles not authorized to operate in the area under surveillance, the interrogation repetition interval may be varied according to a code known only to the interrogator programmer. In cases where there are many interrogators operating in close proximity, the interrogation repetition interval of each may be set to a different value to assist in rejection of simultaneous transponder responses as they are sensed by the decoder/digital processor.

Regardless of the interrogation timing sequence of the interrogation pulse generator 2, it will always transmit to the decoder/digital processor 12, a precise measurement of the interpulse period. These measurements will be available to the decoder/digital processor 12 as a sequence of time values representing the interval between interrogation signals.

The signal transmitted by interrogator antenna 3 is received by a multiplicity of transponder antennas 4 and is amplified by transponder receivers 5. The amplified signal is transferred to transmitter 6 and PRI generator 8.

In the transmitter 6 an oscillator may be locked to the receiver signal and its output combined with the spectrally pure output of the offset frequency generator 7. The resulting frequency is a spectrally pure signal that is offset from the interrogation transmitter signal by an amount sufficient to allow separation of the two signals in the interrogation receiver 12 and by the one way doppler shift resulting from any relative velocity between the interrogator and the transponder.

Transmitter 6 is normally gated off and remains so until a binary coded signal from the binary code generator 9 gates it on. The binary code is unique to each transponding vehicle or other moveable device authorized to operate in the environment. For example, for road traffic it may be a binary code representing the vehicle identification number (VIN). When gated on the transmitter 6 signal, which includes the binary code, is radiated through antenna 10 and is received by antenna 11 in the interrogator. In certain implementations it may be possible to combine the functions of antennas 3 and 11 and combine the functions of antennas 4 and 10.

The transponder receiver 5 signal is operated on by the PRI generator 8. First the interrogation signals are stripped from the overall signal. Second, after a number N of these signals have been counted, the PRI generator 8 transmits a pulse to the binary code generator 9. This pulse is transmitted in synchronism with an interrogation signal. The binary code generator 9 is activated upon receipt of the pulse and starts the transmitter sequence described above. A new number N is then selected by the PRI generator.

Generation of the PRI number N is controlled by algorithms in the PRI generator 8. These algorithms may be programmable and will depend on the characteristics desired in the system. In my application Ser. No. 07/850,423, N was described, for example, as a random number uniformly distributed between maximum and minimum limits. A different distribution may be used when it is desirable to detect low relative velocities between the interrogator and the transponder. In this case the low doppler shift frequency can be measured by the decoder/digital processor 14 more accurately and in a shorter interval of time if the number N is biased toward smaller values while retaining the same mean value of the distribution. When it is desirable to detect hostile responses which may be attempting to mimic the response of friendly forces then the number N may be a pseudo random sequence whose characteristics are known only to the transponder and interrogator programmers and which are recognizable by the decoder/digital processor. Responses not having the appropriate characteristics are rejected or designated to the operator as hostile.

There are many algorithms that will generate sequences of the number N that are useful in this invention but they must all meet the requirement that the resulting transponder response is synchronized with a particular interrogation signal and an individual transponder that is illuminated by a given interrogator must generate number N sequences that are different from that of all other transponders that are similarly illuminated.

The signals received by antenna 11 include the transponder coded signal from antenna 10 and an interrogator signal that has been reflected by the vehicle or other movable device, that is, the skin reflection signal. Note that the skin reflection will differ in frequency from the interrogator signal by plus or minus the two-way doppler shift while the transponder signal will differ by the offset frequency plus or minus the two-way doppler shift. These signals are amplified in receiver 12.

The offset frequency generator 13 is identical to the offset frequency generators in the multiple transponders and generates a spectrally pure signal at the same frequency.

The interrogation transmitter 1 frequency, the interrogation pulse generator 2 timing, the receiver 12 signals, the offset frequency generator 13 frequency, "wanted" vehicle data, if any, and interrogation platform velocity data, if any, are all entered into the decoder/digital processor 14.

Referring to FIG. 2, the message decoder 15 separates the skin reflection and transponder coded responses and checks the validity of the transponder codes. Codes may be rejected as invalid, for example, if they do not meet signal-to-noise ratio requirements, are excessively corrupted by the probalistic simultaneous reception of two or more transponder codes, do not show consistent ranges on successive responses, do not show consistent velocities on successive responses, or are invalid for other reasons.

Codes that are deemed valid are transferred to the display/data link logic where a separate file is initiate for each different code received. The file logic enters in memory the identifications code and the time the code was received. Files may be terminated if a preprogrammed number of valid codes are not received within a preprogrammed time interval. File contents that are not terminated are transferred to downstream systems. File codes may be compared to stored "wanted" vehicle codes and "wanted" codes may be output to downstream display or data link devices.

The doppler velocity conversion device 16 performs the function of combining the interrogator transmitter frequency signal and the interrogator offset frequency signal to produce a reference signal for measuring the doppler shift of the received transponder signals. The phase relationship between this reference signal and the transponder signal is determined using conventional techniques. The rate of change of this phase angle as a function of time is proportional to the doppler frequency. Doppler ambiguities which may result from the sampling characteristics of the variable transponder or interrogator repetition interval operation are resolved by projecting each rate of change of phase forward in time until the next occurrence of the receipt of that particular code. A new phase relationship is then determined. The filtered and scaled rate of change of phase of a given code's phase history is stored in the file for that particular code. This is the closing velocity of that code vehicle. Doppler measurements that are not consistent as a function of time may be rejected as invalid.

In an alternate mechanization, the interrogation transmitter frequency itself may be used as the reference for the doppler measurement. In this mechanization the received transponder signals are offset in frequency by an amount equal to the offset frequency generator 13 signal but in an opposite sense from that of the transponder offset. The rate of change of the phase relationship between this signal and the transmitter frequency is, as before, proportional to the doppler frequency.

If the interrogation device is mounted on a moving platform, that platform's velocity may be added algebraically to the closing velocity to obtain the transponder velocity.

The time delay range conversion device 17 generates two range values, one based on the time difference between the interrogation signal time and the transponder response time and the other based on the time difference between the interrogation signal time and the skin reflection time.

Range to the particular transponder is determined by correcting the transponder response time for known time delays in the system and in turn converting this two way travel time to appropriate units. The resulting range value is transferred to the appropriate code file provided consistent range values are obtained on successive responses.

Skin reflection radar times are converted to range using conventional radar techniques. The resulting values are compared to transponder derived ranges. If there is no transponder range at the particular skin reflection range, the time delay range conversion module 17 generates an "inoperative transponder" output which may include range to the suspected vehicle.

As time advances each transponder code file will contain the following data:
a—The transponder code of a vehicle that has responded to the interrogation,
b—The velocity of the vehicle carrying that particular code,
c—The distance to the vehicle carrying that code, and
d—The time history of the observations.

As the number of transponders within the surveillance area increases, the time interval required to generate a transponder code file may increase because of the rejection of invalid returns but the system will never saturate in the sense that it will fail to detect some codes.

This description covers a single channel system in which there is only one receiver 12 and antenna 11. If it is desirable to determine the angle between the transponder return and the boresite of the interrogator antenna, a multi-channel system may be used in which multiple antennas 11 whose phase centers are displaced in azimuth or elevation feed multiple receivers 12 and decoder digital processors 14. The phase angle between the multi-channel receiver signals for a given transponder return will be proportional to the angle between the boresite of the antenna and the line of sight to the transponder. This angle measure may be added to the transponder code file for use by downstream systems.

What is claimed and desired to be secured by Letters Patent is:

1. An interrogator and transponder system for identifying and classifying multiple moveable objects comprising,
   a. at least one interrogator comprising transmitter means, said transmitter transmitting interrogation signal,
   b. multiple remotely located transponder means each mounted on a moveable object, receiver means in said transponder feeding transponder transmitter means, means in said transponder transmitter for generating a first frequency the same as the received interrogation signal frequency and means for generating a second transponder offset frequency signal that is substantially identical in all transponders, and means for combining said two frequencies to produce a third transponder transmitter carrier frequency signal,
   c. code generator means in said transponders, each generating a code that is unique to the moveable object on which the transponder is mounted,
   d. transponder pulse repetition interval generator means for generating a time sequence of transponder pulses, means for causing these pulses to bear a fixed time relationship to an interrogation signal and means for varying the number of interrogation signals between transponder pulses that is unique to each of a multiplicity of transponders,
   e. means for initiating a transponder transmitter output signal that is coded with said code for each of said transponder pulses,
   f. receiver and decoder/digital processor means located at each interrogator, said means combining the interrogation transmitter frequency with the frequency output of an interrogation offset frequency generator means, said offset frequency being substantially identical to the transponders offset frequency and means for using the resulting frequency as a reference frequency for measuring the rate of change of phase between the reference signal and the received transponder signals,
   g. means for converting the measured rate of change of phase into a closing velocity and means for converting the measured time delay into a range distance and means for storing each range and velocity with the associated transponder code.

2. The interrogator and transponders of claim 1 in which the decoder/digital processor means combine the received transponder signals with the output of an interrogator offset frequency generator means, said offset frequency being substantially identical to the transponders offset frequency and means for determining the doppler frequency by determining the rate of change of phase between the combined signal and the interrogator transmitter signal used as a reference.

3. The interrogator and transponders of claim 1 wherein the means for measuring said rate of change of phase includes means for predicting the phase relationship in future time and means for combining the predicted phase relationship with new measurements of phase relationship to obtain a phase relationship of improved accuracy.

4. The interrogator and transponders of claim 1 wherein the transponder pulse repetition interval generator means includes means for generating a sequence of pulses with relatively few interrogation signals between them followed by a sequence of pulses with a relatively larger number of interrogation signals between them.

5. The interrogator and transponders of claim 1 wherein interrogation pulse generator means include programmable means for varying the interval between interrogation signals.

6. The interrogator and transponders of claim 1 wherein means compare range and velocity derived from moveable object skin reflections with transponder-derived range and velocity and means for generating an output if there is not transponder-derived range and velocity at a particular skin reflection range and velocity.

* * * * *